United States Patent
Rogers

(10) Patent No.: US 9,590,351 B2
(45) Date of Patent: Mar. 7, 2017

(54) CABLE STRAIN RELIEF

(71) Applicant: Kidde Technologies Inc., Wilson, NC (US)

(72) Inventor: Aaron Stanley Rogers, Surf City, NC (US)

(73) Assignee: Kidde Technologies Inc., Wilson, NC (US)

( * ) Notice: Subject to any disclaimer, the term of this patent is extended or adjusted under 35 U.S.C. 154(b) by 0 days.

(21) Appl. No.: 14/626,587

(22) Filed: Feb. 19, 2015

(65) Prior Publication Data

US 2016/0248196 A1    Aug. 25, 2016

(51) Int. Cl.
*H01R 13/58* (2006.01)
*H02G 15/007* (2006.01)
*H01R 9/05* (2006.01)
*H01R 13/6592* (2011.01)

(52) U.S. Cl.
CPC .......... *H01R 13/5804* (2013.01); *H01R 9/05* (2013.01); *H01R 13/5833* (2013.01); *H01R 13/6592* (2013.01); *H02G 15/007* (2013.01)

(58) Field of Classification Search
CPC .................................................. H01R 13/5833
USPC .................... 439/457, 458, 459; 174/153 G; 242/587.2, 118.4, 118.7
See application file for complete search history.

(56) References Cited

U.S. PATENT DOCUMENTS

| | | | | |
|---|---|---|---|---|
| 2,537,232 A | * | 1/1951 | Nottingham | E03F 3/04 215/307 |
| 2,587,707 A | * | 3/1952 | Dever | H02G 11/02 191/12 R |
| 3,607,451 A | | 9/1971 | Ahmad | |
| 3,844,573 A | * | 10/1974 | Wright | H02G 15/113 174/92 |
| 4,169,572 A | | 10/1979 | Simon | |
| 4,193,563 A | * | 3/1980 | Vitale | B65H 75/06 242/388.5 |
| 4,270,832 A | * | 6/1981 | Tanabe | H01R 24/568 439/457 |
| 4,354,651 A | | 10/1982 | Simon | |
| 4,387,863 A | * | 6/1983 | Edmonston | B65H 75/14 242/118.4 |
| 4,664,464 A | | 5/1987 | Hutter et al. | |
| 5,255,866 A | | 10/1993 | Campolo | |
| 5,306,176 A | * | 4/1994 | Coffey | H01R 13/6392 439/367 |

(Continued)

FOREIGN PATENT DOCUMENTS

GB    2043367 A    10/1980

OTHER PUBLICATIONS

European Search Report dated Jun. 1, 2016, for corresponding European Application No. 16156557.

*Primary Examiner* — Neil Abrams
(74) *Attorney, Agent, or Firm* — Kinney & Lange, P.A.

(57) ABSTRACT

An embodiment of a cable assembly includes a cable including at least a shielded conductor, a mating connector mounted to a first assembly end, and an elongated strain relief grommet disposed longitudinally between the cable and the mating connector. The strain relief grommet includes a grommet body formed from a compressible material. The body includes a first grommet end portion disposed proximate to the mating connector, and a second grommet end portion disposed distal to the mating connector.

15 Claims, 5 Drawing Sheets

(56) References Cited

U.S. PATENT DOCUMENTS

| | | | |
|---|---|---|---|
| 6,264,503 B1 | 7/2001 | Emery | |
| 6,471,545 B1 * | 10/2002 | Hosler, Sr. | H01R 24/542 |
| | | | 439/205 |
| 7,163,417 B2 * | 1/2007 | Brodin | H01R 9/032 |
| | | | 439/457 |
| 7,189,115 B1 | 3/2007 | Montena | |
| 7,344,408 B2 * | 3/2008 | Kato | H01R 13/5205 |
| | | | 439/578 |
| 7,465,875 B2 * | 12/2008 | Dorner | H02G 3/22 |
| | | | 174/74 A |
| 7,487,932 B2 * | 2/2009 | Ellis | B65H 75/148 |
| | | | 242/125.2 |
| 7,488,196 B2 * | 2/2009 | Kocher | H01R 4/26 |
| | | | 439/393 |
| 7,641,503 B1 | 1/2010 | van der Horn et al. | |
| 7,651,047 B2 * | 1/2010 | Peng | B65H 75/04 |
| | | | 242/118.4 |
| 7,661,623 B2 * | 2/2010 | Peng | B65H 75/04 |
| | | | 242/118.4 |
| 7,680,544 B1 | 3/2010 | Conger | |
| 8,007,314 B2 * | 8/2011 | Chawgo | H01R 9/0524 |
| | | | 439/548 |
| 8,654,602 B2 | 2/2014 | Mazure et al. | |
| 8,771,013 B2 | 7/2014 | Kalayjian et al. | |
| 2008/0245919 A1 | 10/2008 | Peng et al. | |

* cited by examiner

CABLE STRAIN RELIEF

BACKGROUND

The disclosure relates generally to coaxial and shielded wires, and more specifically to strain relief for such wires.

Coaxial and shielded wires require mechanical strain relief to mitigate the effects of tension on a conductor, and to prevent it from being pulled out of end connectors. Tension loading on the conductor can alter its electrical connection and performance properties of the conductor.

Common mechanical strain-relief mechanisms or methods are based on (a) axial wire friction compression ferrules or nuts or (b) wire knots or loops against a backstop. However, as wire diameters get smaller, wire signal quality or resistance become more critical, or operating temperature ranges become larger, these methods become less viable.

SUMMARY

An embodiment of a cable assembly includes a cable including at least a shielded conductor, a mating connector mounted to a first assembly end, and an elongated strain relief grommet disposed longitudinally between the cable and the mating connector. The strain relief grommet includes a grommet body formed from a compressible material. The body includes a first grommet end portion disposed proximate to the mating connector, and a second grommet end portion disposed distal to the mating connector.

An embodiment of a grommet includes a body formed from a compressible material. A first conductor passage extends longitudinally through at least the first grommet end portion. A second conductor passage extends longitudinally through at least the second grommet end portion.

DETAILED DESCRIPTION

Generally, the disclosure describes a strain-relief mechanism which includes a wire/conductor wrapped in various ways around a compressible elastomer grommet. The example embodiments of the strain relief grommet have various passages and slits for building in additional length of the conductor while absorbing a majority of the bending and compressive stresses often seen at the end(s) of a coaxial assembly. The grommet can include, for example, a reduced diameter center section and/or an odd number of longitudinal passages for receiving the wire. The conductor is wrapped around the grommet in such a way that tension in the conductor compresses the grommet which restricts further movement or slippage of the conductor.

Figure 1:
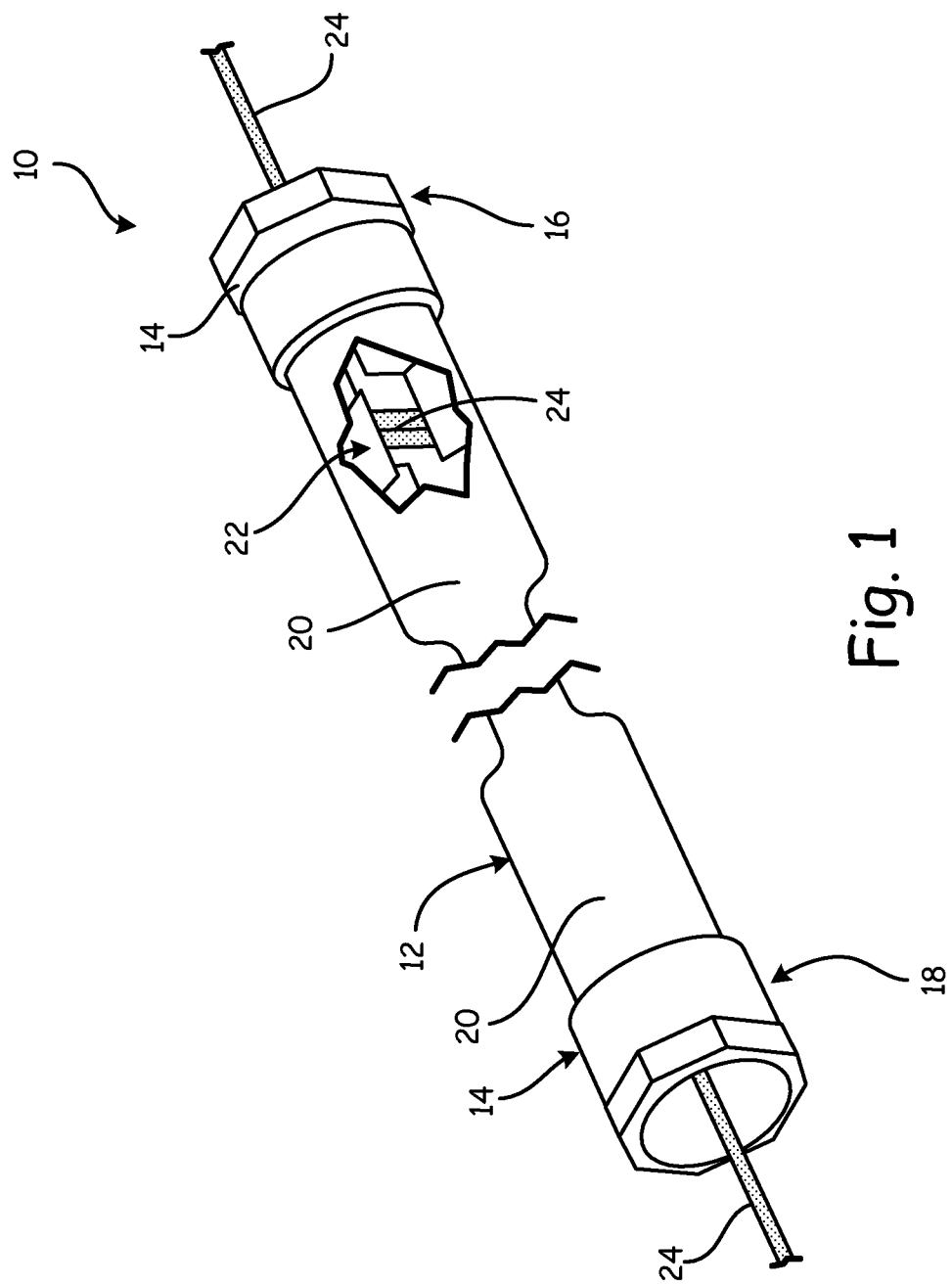
FIG. 1 is a perspective view of a coaxial cable with a mating connector.

FIG. 1 shows a general cable assembly 10, and which includes central portion 12 and optional mating connector 14 mounted to first end 16 of assembly 10. A second mating connector 14 can optionally be mounted to second assembly end 18 as well. Cable assembly 10 also includes outer sleeve 20, which can contain strain relief grommet(s) 22 and cable conductor 24. Conductor 24, which can be shielded or be provided as part of another configuration, can extend through cable assembly 10 from first end 16 to second end 18, including through strain relief grommet 22 and through mating connector 14 at first end 16. A second strain relief grommet (not visible in FIG. 1) can be disposed at second assembly end 18 proximate mating connector 14.

Figure 2:
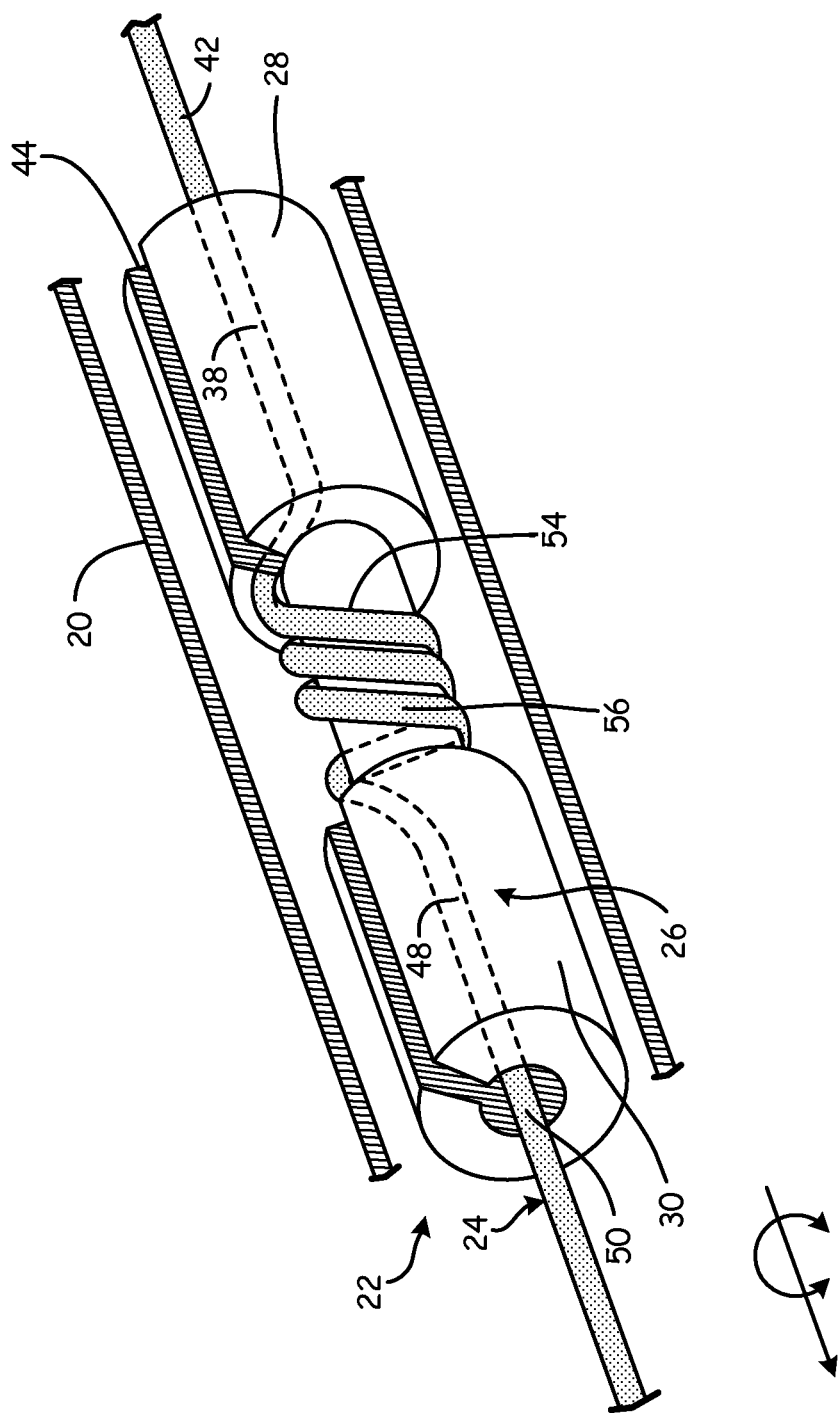
FIG. 2 is a sectional view of the coaxial cable shown in FIG. 1 with a first example embodiment of a strain relief grommet adjacent to the mating connector.

FIG. 2 shows a cut away portion of cable assembly 10. In this example, central cable portion 12 includes outer sleeve 20 encasing strain relief grommet 22 and shielded cable/conductor 24. In certain instances, cable assembly 10 includes only a single shielded wire (i.e., conductor 24), but in others, conductor 24 is at least part of a coaxial cable or another cable with multiple conductors. Depending on the configuration, conductor 24 can be shielded by way of a coating or other nonconductive surface added to the exterior of conductor 24.

Regardless of the exact configuration of cable portion 12, conductor 24 includes at least one flexible metal wire, and can be shielded except for end portions extending beyond mating connectors 14 (shown in FIG. 1). Strain relief grommet 22, details shown in subsequent figures, is configured so that conductor 24 can be wound around it in such a way as to reduce tension and bending stresses in (sometimes) a relatively small gauge conductor 24. Such stresses are otherwise commonly seen at the mounting or attachment ends of a cable assembly.

Note that the example embodiments are sometimes described with respect to a cable assembly which includes a coaxial cable (e.g., one with an outer conductor shielded from an inner conductor). However, it will be appreciated that the disclosure can be readily adapted to any type of cable with at least one conductor, such as a cable assembly having only a shielded inner/center conductor and no outer conductor.

Here, this example embodiment of strain relief grommet 22 includes body 26, which can be formed from a compressible material such as an elastomer. Body 26 can also include first grommet end portion 28 disposed proximate to mating connector 14 (shown in FIG. 1), while second grommet end portion 30 can be disposed distal to mating connector 14.

In FIG. 2, strain relief grommet 22 includes first conductor passage 38 extending longitudinally through at least first grommet end portion 28. A first conductor portion 42 is received in first conductor passage 38. First conductor portion 42 can be inserted longitudinally from first grommet end portion 28, or via first slit 44 extending longitudinally through at least first grommet end portion 28. First slit 44 can provide radial access to first conductor passage 38 for first conductor portion 42.

Here, strain relief grommet 22 also includes second conductor passage 48 extending longitudinally through at least second grommet end portion 30. Similar to first conductor portion 42 received in first conductor passage 38, second conductor portion 50 can be received in second conductor passage 48. Second slit 52 can provide radial access to second conductor passage 48.

In this example embodiment, grommet body 26 also includes a reduced diameter grommet portion 54 disposed longitudinally between first and second grommet end portions 28, 30. At least one of first and second conductor passages 38, 48 can be disposed in a center of the corresponding first and/or second grommet end portions 28, 30. Slits 44, 52 can thus extend radially into provide access to first and second conductor passages 38, 48.

After first conductor portion 42 is received into first passage 38 and/or second conductor portion 50 is received into second conductor passage 48 (either radially or via slits 44, 52), a wound conductor portion 56 can be wrapped at least once around reduced diameter grommet portion 54. To provide substantial strain relief, additional length provided by wound conductor portion 56 allows for slack in conductor 24 at first assembly end 16, and which is taken up in the presence of tension. This tension may be from bending, pulling, or other forces seen at the ends of cables secured to a relatively fixed device (not shown).

It can be seen that tension from one or both ends of conductor 24 will be transferred to wound conductor portion 56. Under tension, wound conductor portion 56 compresses grommet body 26, particularly reduced diameter grommet portion 54, which reduces further axial and torsional deflection of conductor 24.

This causes wound conductor portion to be pulled tightly around reduced diameter grommet portion 54, compressing it and further reducing its diameter. This compression has the effect of restricting longitudinal movement of conductor 24. Testing has found that tensile strength of this combination approaches and nearly equals the overall tensile strength of the wire alone. Typically, other known strain relief approaches do not rise to this level. Thus in conjunction with the compressible nature of grommet body 26, strain relief grommet 22 provides substantial freedom of movement and force dispersion without unduly complicating assembly.

Figure 3:
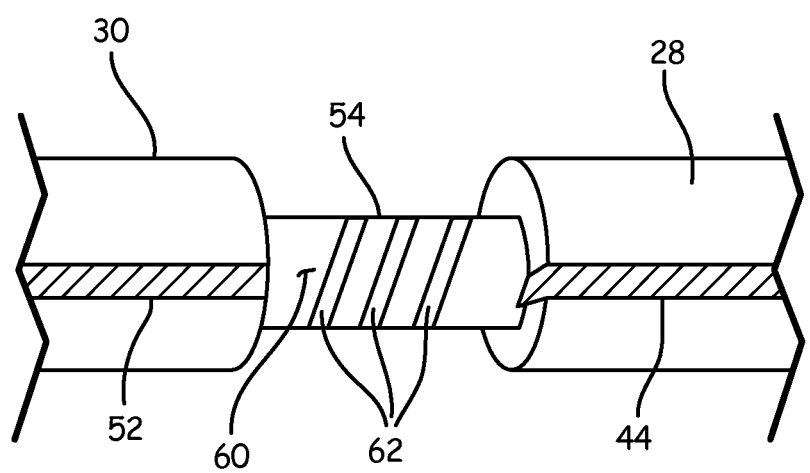
FIG. 3 includes a detailed view of a strain relief grommet shown in FIG. 2.

FIG. 3 shows a detailed view of grommet body 26, particularly reduced diameter portion 54, here located approximately midway between first and second grommet end portions 28, 30. Outer surface 60 of reduced diameter grommet portion 54 can include at least one spiral recess 62 for retaining wound conductor portion 54 between first and second grommet end portions 28, 30. Spiral recesses 62, which can be grooved or otherwise shaped at or about a 45 degree angle, simplify insertion and retention of conductor 24. Second slit 52 can optionally be circumferentially aligned with first slit 44 to further simplify assembly.

In certain alternative embodiments (e.g., FIGS. 4 and 5), first and/or second conductor passages can extend longitudinally through substantially an entire length of the body between the first and second grommet end portions.

Figure 4:
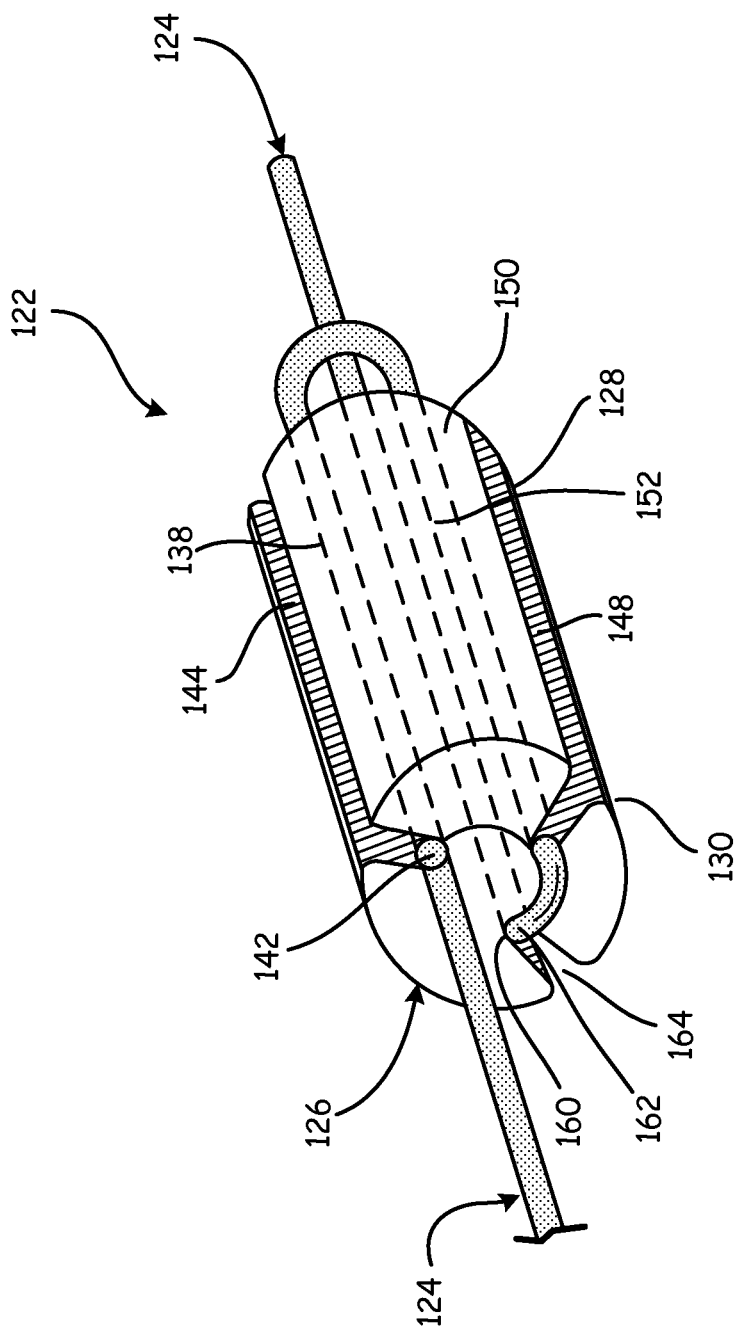
FIG. 4 is a coaxial cable with a second example embodiment of a strain relief grommet adjacent to the mating connector.

FIG. 4 shows an alternative strain relief grommet 122 which also includes conductor 124 passing through grommet body 126. As in the first example, body 126 can be formed from a compressible material and can include first grommet end portion 128 and second grommet end portion 130. First conductor passage 138 can extend longitudinally through at least first grommet end portion 128, and second conductor passage 148 extends through at least second grommet end portion 130. Also similar to the first example, a first conductor portion 140 can be received in first conductor passage 138, while second conductor portion 150 can be received in second conductor passage 148.

Here, however, grommet body 126 does not include a reduced diameter grommet portion, but rather has a substantially constant cross-sectional area. And further, first and second conductor passages 138, 148 extend longitudinally through substantially an entire length of body 126 between first and second grommet end portions 128, 130. As such, rather than being longitudinally spaced apart and optionally in circumferential alignment, first and second are circumferentially spaced apart around the entirety of body 126. And since conductor passages 138, 148 are spaced circumferentially instead of longitudinally, they are not located at the center of body 126 (nor at the center of first and second grommet end portions 128, 130).

Figure 5:
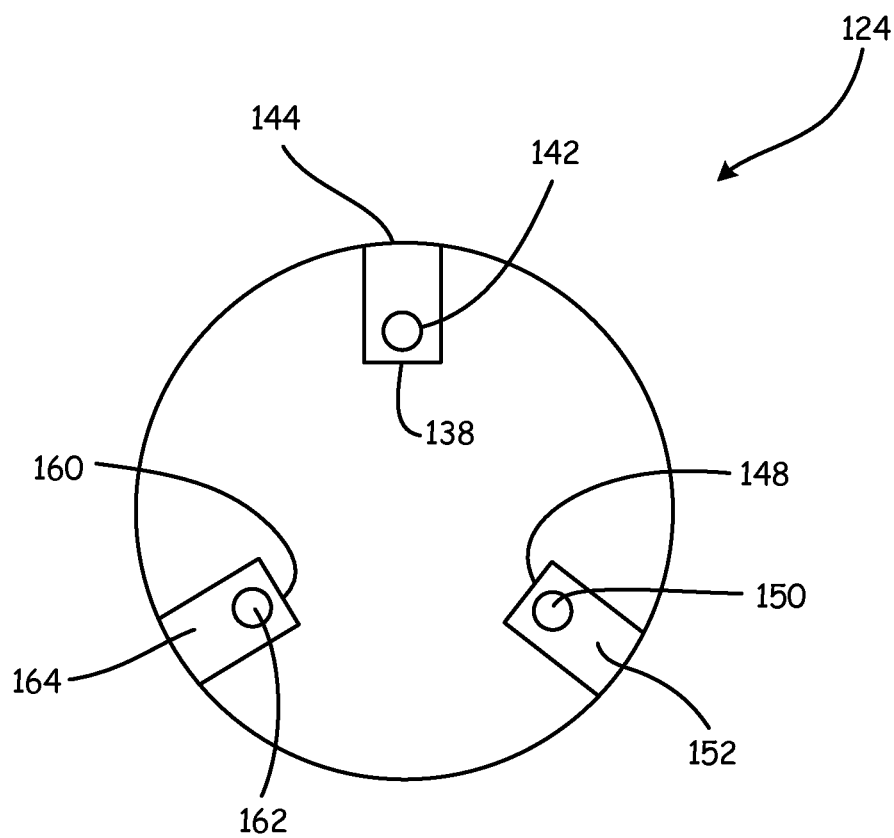
FIG. 5 is a sectional view of the strain relief grommet shown in FIG. 4.

Instead, to keep different portions of conductor 124 separated, FIG. 5 shows a sectional view of grommet body 126, which shows passages 138, 148 merely recessed into grommet body 126 relative to its outer surface. For radial access and assembly of conductor 124 to passages 138, 148, respective first slit 144 and second slit 152 can extend longitudinally through at least first and second grommet end portions 128, 130.

To further facilitate additional length of conductor 124 about grommet 122, while ensuring that conductor 124 exits on the correct end of coaxial assembly 110, conductor 124 can be wrapped an odd number of times longitudinally about grommet body 126. As such, grommet 122 also includes a third conductor passage 160, for retaining third conductor portion 162, and which is radially accessible via third slit 164. While it is not strictly necessary to facilitate an odd number of passes of conductor 124 (e.g., three passes shown in FIG. 4), grommet body 126 can have an odd number of passages.

This approach works in a similar manner as to the first example embodiment, in which slack is provided to the wire that is used to compress the grommet when under tension and in turn, restrict further longitudinal movement of the conductor as tension increases. In both example embodiments, axial tension forces on the wire external to the strain relief grommet are transferred radially to the body of the grommet such that minimal axial force loads remain in the wire center conductor. Additionally any external wire torsional loads are captured in the strain relief mechanism and are not transferred to the wire center conductor.

Discussion of Possible Embodiments

The following are non-exclusive descriptions of possible embodiments of the present disclosure.

An embodiment of a cable assembly includes a cable including at least a shielded conductor, a mating connector mounted to a first assembly end, and an elongated strain relief grommet disposed longitudinally between the cable and the mating connector. The strain relief grommet includes a grommet body formed from a compressible material. The body includes a first grommet end portion disposed proximate to the mating connector, and a second grommet end portion disposed distal to the mating connector.

The cable assembly of the preceding paragraph can optionally include, additionally and/or alternatively, any one or more of the following features, configurations and/or additional components:

A cable assembly according to an exemplary embodiment of this disclosure, among other possible things includes a cable including at least a shielded conductor; a mating connector mounted to a first assembly end; and an elongated strain relief grommet disposed longitudinally between the cable and the mating connector, the strain relief grommet comprising: a grommet body formed from a compressible material, the body including a first grommet end portion disposed proximate to the mating connector, and a second grommet end portion disposed distal to the mating connector.

A further embodiment of the foregoing assembly, wherein the strain relief grommet further comprises: a first conductor passage extending longitudinally through at least the first grommet end portion.

A further embodiment of any of the foregoing assemblies, wherein the strain relief grommet further comprises: a first slit extending longitudinally through at least the first grommet end portion, the first slit providing radial access to the first conductor passage.

A further embodiment of any of the foregoing assemblies, wherein the strain relief grommet further comprises: a second conductor passage extending longitudinally through at least the second grommet end portion.

A further embodiment of any of the foregoing assemblies, wherein at least one of the first conductor passage and the second conductor passage are disposed in a radial center of the corresponding first grommet end portion and the second grommet end portion.

A further embodiment of any of the foregoing assemblies, wherein the strain relief grommet further comprises: a second slit circumferentially aligned with the first slit and extending longitudinally through at least the second grommet end portion, the second slit providing radial access to the second conductor passage.

A further embodiment of any of the foregoing assemblies, wherein the grommet body also includes a reduced diameter grommet portion disposed longitudinally between the first and second grommet end portions.

A further embodiment of any of the foregoing assemblies, wherein: a first conductor portion is received in the first conductor passage; a second conductor portion is received in the second conductor passage; and a wound conductor portion is wrapped at least once around the reduced diameter grommet portion.

A further embodiment of any of the foregoing assemblies, wherein an outer surface of the middle grommet portion includes at least one spiral recess retaining the wound conductor portion between the first and second grommet end portions.

An embodiment of a grommet includes a body formed from a compressible material. A first conductor passage extends longitudinally through at least the first grommet end portion. A second conductor passage extends longitudinally through at least the second grommet end portion.

The cable assembly of the preceding paragraph can optionally include, additionally and/or alternatively, any one or more of the following features, configurations and/or additional components:

A cable assembly according to an exemplary embodiment of this disclosure, among other possible things includes a body formed from a compressible material, the body including a first grommet end portion and a second grommet end portion; a first conductor passage extending longitudinally through at least the first grommet end portion; and a second conductor passage extending longitudinally through at least the second grommet end portion.

A further embodiment of the foregoing grommet, further comprising: a first slit extending longitudinally through the first grommet end portion providing radial access to the first passage; and a second slit extending longitudinally through the second grommet end portion providing radial access to the second passage.

A further embodiment of any of the foregoing grommets, wherein the body also includes a reduced diameter grommet portion disposed longitudinally between the first and second grommet end portions.

A further embodiment of any of the foregoing grommets, wherein an outer surface of the middle grommet portion includes at least one spiral recess for retaining a conductor between the first and second grommet end portions.

A further embodiment of any of the foregoing grommets, further comprising: a first shielded conductor portion received in the first conductor passage; a second shielded conductor portion received in the second conductor passage; and a wound shielded conductor portion wrapped at least once around the reduced diameter grommet portion.

A further embodiment of any of the foregoing grommets, wherein at least one of the first passage and the second passage extends longitudinally through substantially an entire length of the body between the first and second grommet end portions.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A cable assembly comprising:
   a cable portion including at least a shielded conductor;
   a mating connector mounted to a first assembly end; and
   an elongated strain relief grommet disposed longitudinally between the cable portion and the mating connector, the strain relief grommet comprising:
      a grommet body formed from a compressible material, the body including a first grommet end portion disposed proximate to the mating connector, and a second grommet end portion disposed distal to the mating connector;
      a first conductor passage extending longitudinally through at least the first grommet end portion; and
      a second conductor passage extending longitudinally through at least the second grommet end portion;
   wherein:
      the grommet body also includes a reduced diameter grommet portion disposed longitudinally between the first and second grommet end portions;
      a first conductor portion is received in the first conductor passage;
      a second conductor portion is received in the second conductor passage; and
      a wound conductor portion is wrapped at least once around the reduced diameter grommet portion;
      wherein an outer surface of the middle grommet portion includes at least one spiral recess retaining the wound conductor portion between the first and second grommet end portions.

2. The assembly of claim 1, wherein the strain relief grommet further comprises:
   a first slit extending longitudinally through at least the first grommet end portion, the first slit providing radial access to the first conductor passage.

3. The assembly of claim 1, wherein at least one of the first conductor passage and the second conductor passage are disposed in a radial center of the corresponding first grommet end portion and the second grommet end portion.

4. The assembly of claim 1, wherein the strain relief grommet further comprises:
   a second slit circumferentially aligned with the first slit and extending longitudinally through at least the second grommet end portion, the second slit providing radial access to the second conductor passage.

5. A grommet comprising:
a body formed from a compressible material, the body including a reduced diameter grommet portion disposed longitudinally between a first grommet end portion and a second grommet end portion;
a first conductor passage extending longitudinally through at least the first grommet end portion; and
a second conductor passage extending longitudinally through at least the second grommet end portion;
wherein an outer surface of the reduced diameter grommet portion includes at least one spiral recess for retaining a conductor between the first and second grommet end portions.

6. The grommet of claim 5, further comprising:
a first slit extending longitudinally through the first grommet end portion providing radial access to the first passage; and
a second slit extending longitudinally through the second grommet end portion providing radial access to the second passage.

7. The grommet of claim 5, further comprising:
a first shielded conductor portion received in the first conductor passage;
a second shielded conductor portion received in the second conductor passage; and
a wound shielded conductor portion wrapped at least once around the reduced diameter grommet portion.

8. The grommet of claim 5, wherein at least one of the first passage and the second passage extends longitudinally through substantially an entire length of the body between the first and second grommet end portions.

9. A cable assembly comprising:
a cable portion including at least a shielded conductor;
a mating connector mounted to a first assembly end; and
an elongated strain relief grommet according to claim 5, the strain relief grommet disposed longitudinally between the cable portion and the mating connector.

10. The assembly of claim 9, wherein at least one of the first conductor passage and the second conductor passage are disposed in a radial center of the corresponding first grommet end portion and the second grommet end portion.

11. The assembly of claim 9, wherein the strain relief grommet further comprises:
a first slit extending longitudinally through at least the first grommet end portion, the first slit providing radial access to the first conductor passage.

12. The assembly of claim 11, wherein the strain relief grommet further comprises:
a second slit circumferentially aligned with the first slit and extending longitudinally through at least the second grommet end portion, the second slit providing radial access to the second conductor passage.

13. The assembly of claim 9, further comprising:
a first portion of the conductor received in the first conductor passage; and
a second conductor portion is received in the second conductor passage;
wherein the wound conductor portion is wrapped at least once around the reduced diameter grommet portion.

14. A grommet comprising:
a body formed from a compressible material, the body including a reduced diameter grommet portion disposed longitudinally between a first grommet end portion and a second grommet end portion;
a first conductor passage extending longitudinally through at least the first grommet end portion;
a second conductor passage extending longitudinally through at least the second grommet end portion;
a first shielded conductor portion received in the first conductor passage;
a second shielded conductor portion received in the second conductor passage; and
a wound shielded conductor portion wrapped at least once around the reduced diameter grommet portion;
wherein an outer surface of the reduced diameter grommet portion includes at least one spiral recess for retaining the wound shielded conductor portion between the first and second grommet end portions.

15. The grommet of claim 14, further comprising:
a first slit extending longitudinally through the first grommet end portion providing radial access to the first passage; and
a second slit extending longitudinally through the second grommet end portion providing radial access to the second passage.

* * * * *